US008658328B2

(12) United States Patent
Suda et al.

(10) Patent No.: US 8,658,328 B2
(45) Date of Patent: Feb. 25, 2014

(54) STACK STRUCTURE FOR LAMINATED SOLID OXIDE FUEL CELL, LAMINATED SOLID OXIDE FUEL CELL AND MANUFACTURING METHOD

(75) Inventors: Seiichi Suda, Nagoya (JP); Kaori Jono, Nagoya (JP); Fumio Hashimoto, Nagoya (JP); Takayuki Hashimoto, Nagoya (JP)

(73) Assignees: Japan Fine Ceramics Center, Aichi (JP); FCO Power, Inc., Aichi (JP)

( * ) Notice: Subject to any disclaimer, the term of this patent is extended or adjusted under 35 U.S.C. 154(b) by 369 days.

(21) Appl. No.: 12/934,471

(22) PCT Filed: Mar. 26, 2009

(86) PCT No.: PCT/JP2009/056188
§ 371 (c)(1),
(2), (4) Date: Jan. 28, 2011

(87) PCT Pub. No.: WO2009/119771
PCT Pub. Date: Oct. 1, 2009

(65) Prior Publication Data
US 2011/0111320 A1    May 12, 2011

(30) Foreign Application Priority Data
Mar. 26, 2008  (JP) ................... 2008-080794

(51) Int. Cl.
*H01M 8/24*  (2006.01)
*H01M 8/00*  (2006.01)
*H01M 8/02*  (2006.01)

(52) U.S. Cl.
USPC ........... 429/469; 429/465; 429/467; 429/468; 429/470; 429/535

(58) Field of Classification Search
USPC ................... 429/467, 468, 469, 535
See application file for complete search history.

(56) References Cited

U.S. PATENT DOCUMENTS

| 5,589,285 A | 12/1996 | Cable et al. |
| 2002/0058175 A1 | 5/2002 | Ruhl |
| 2006/0003213 A1* | 1/2006 | Ketcham et al. .......... 429/30 |
| 2009/0286125 A1* | 11/2009 | Setlock et al. ............ 429/30 |
| 2010/0151348 A1* | 6/2010 | Higashi et al. .......... 429/479 |

FOREIGN PATENT DOCUMENTS

| EP | 1199760 A1 | 4/2002 |
| JP | 58129766 A | 8/1983 |
| JP | 7045295 A | 2/1995 |
| JP | 2003297387 A | 10/2003 |
| JP | 2003346842 A | 12/2003 |
| JP | 2005085522 A | 3/2005 |
| JP | 2007273429 A | 10/2007 |
| JP | 2007287585 A | 11/2007 |
| JP | 2008034373 A | 2/2008 |
| WO | 2006086037 A1 | 8/2006 |
| WO | WO 2007034835 | * 3/2007 |

OTHER PUBLICATIONS

International Preliminary Examination Report (IPER) for International Application No. PCT/JP2009/056188 with English translation; dated Apr. 15, 2010 (8 pages).
International Search Report issued in corresponding International Application No. PCT/JP2009/056188 with English translation; dated Jun. 23, 2009 (4 pages).
Written Opinion issued in corresponding International Application No. PCT/JP2009/056188 with English translation of Cited References and Explanations; dated Jun. 23, 2009 (4 pages).
esp@cenet English Patent Abstract for Japanese Publication No. JP58129766; dated Aug. 2, 1983 (1 page).
Office Action issued in corresponding Chinese Application No. 200980110757.3 dated Dec. 5, 2012, and partial English translation thereof (8 pages).
Extended European Search Report issued in corresponding European Application No. 09725111.0 dated Oct. 23, 2012 (5 pages).

* cited by examiner

*Primary Examiner* — Patrick Ryan
*Assistant Examiner* — Ladan Mohaddes
(74) *Attorney, Agent, or Firm* — Osha Liang LLP (57) ABSTRACT

A stack structure for a solid oxide fuel cell includes a plurality of stacked single cells, each having a fuel electrode layer including a fuel electrode and an air electrode layer including an air electrode, the fuel electrode layer and the air electrode layer being arranged opposite each other on either side of a solid electrolyte, separators arranged between the stacked single cells to separate the single cells, and non-porous seal parts located within the fuel electrode layer and the air electrode layer, are equivalent to either the separators or the solid electrolyte at least in terms of thermal expansion and contraction characteristics, and are integrated with an edge of the fuel electrode or an edge of the air electrode, and also with the adjacent separator and the adjacent solid electrolyte.

15 Claims, 9 Drawing Sheets

Laminate

STACK STRUCTURE FOR LAMINATED SOLID OXIDE FUEL CELL, LAMINATED SOLID OXIDE FUEL CELL AND MANUFACTURING METHOD

TECHNICAL FIELD

The present teachings relates to a stack structure for a laminated solid oxide fuel cell, and to a laminated solid oxide fuel cell and a method of manufacturing the same.

BACKGROUND ART

In a solid oxide fuel cell (sometimes abbreviated below as SOFC), a unit consisting of a fuel electrode, a solid electrolyte and an air electrode is called a single cell, and a plurality of these units is stacked to achieve a serial connection and construct a power generating system. Tens to hundreds of single cells must be stacked to obtain adequate power output, and the single cells must be mechanically strong enough to provide stable, long-term power generation in such a highly stacked state. For this reason, it is common to use electrolyte-supported cells comprising a solid electrolyte hundreds of microns thick with a fuel electrode and air electrode tens of microns thick printed on either side of the solid electrolyte.

In order to improve a power generating characteristics of a single cell and consequently the power generating characteristics of a stack, it is necessary to minimize an internal resistance of the single cell. Because the electrolyte has the highest resistance of the components of the single cell, research has been conducted for reducing the thickness of the solid electrolyte (e.g. Patent Document 1).

There has therefore been research into electrode-supported cells, in which the solid electrolyte is made thinner while the thickness of the air electrode and fuel electrode, which have relatively less internal resistance than the solid electrolyte, is increased from hundreds of microns to a few millimeters (e.g. Patent Document 2).

Patent Document 1 Japanese Patent Application Publication No. 2003-346842

Patent Document 2 Japanese Patent Application Publication No. 2005-85522

SUMMARY OF INVENTION

In an electrode-supported cell, the mechanical strength is provided by the electrodes, which are porous and must thus be relatively thick in order to ensure the necessary mechanical strength. Although reducing the thickness of the solid electrolyte reduces the internal resistance of the solid electrolyte itself, moreover, the internal resistance of the electrodes is increased concomitantly, and so the desired improvement in power generating characteristics has yet to be achieved.

In any case, the aforementioned prior art is aimed at ensuring the mechanical strength of the single cell unit. Consequently, the mechanical strength is secured by means of the thickness of some component of the single cell, and a thermal shock resistance declines due to differences in the thermal expansion rates of the components. Up to now, no SOFC stack structure has been provided to solve these problems.

DISCLOSURE OF THE INVENTION

It is therefore an object of the present teachings to provide a laminated SOFC having a stack structure capable of ensuring the mechanical strength of the SOFC as a whole without relying on the mechanical strength of the single cells. It is another object of the present teachings to provide a laminated SOFC having a stack structure capable of effectively reducing internal resistance to provide good power generating characteristics. It is another object of the present teachings to provide a laminated SOFC having a stack structure capable of improving thermal shock resistance. It is still another object of the present teachings to provide a laminated SOFC having a stack structure that can be easily stacked. It is yet another object of the present teachings to provide a manufacturing method for manufacturing such a laminated SOFC.

Abandoning the conventional wisdom of "ensuring the mechanical strength of the single cell", the inventors discovered that if the mechanical strength of the SOFC as a stack structure can be ensured, it is possible to construct the SOFC structure without being constrained by the thickness of the electrodes, solid electrolyte and other cell components in order to ensure the mechanical strength of each single cell. The inventors perfected the present teachings based on this discovery. The followings may be provided by the present teachings.

The present teachings may provide a stack structure for a solid oxide fuel cell, comprising: a plurality of stacked single cells, each having a fuel electrode layer comprising a fuel electrode and an air electrode layer comprising an air electrode, the fuel electrode and the air electrode being arranged opposite each other on either side of a solid electrolyte; separators arranged between the stacked single cells to separate the single cells; and seal parts comprising non-porous parts that are located within the fuel electrode layer and the air electrode layer, are equivalent to either the separators or the solid electrolyte at least in terms of thermal expansion and contraction characteristics, and are integrated with an edge of the fuel electrode or an edge of the air electrode, and also with the adjacent separator and the adjacent solid electrolyte, wherein the stack structure is formed such that a stream of the fuel gas is supplied to the fuel electrode and a stream of the air gas is supplied to the air electrode respectively.

In the stack structure of the present teachings, thicknesses of the solid electrolyte, the fuel electrode layer and the air electrode layer in the single cell are each preferably at least 1 μm but no more than 150 μm. When the thicknesses of these elements are within this range, they can be easily integrated to form a single cell. It is also possible to ensure the strength of the stack structure formed by stacking these single cells. No single cell support with enhanced mechanical strength is preferably provided inside the single cell. This is because providing the single cell support with enhanced mechanical strength actually makes it more difficult to construct the stack structure. The seal parts preferably have a same composition as one of the separators and the solid electrolyte. The seal parts preferably comprise a part of one of the separators and the solid electrolyte that extends into the fuel electrode layer or the air electrode layer. In this stack structure, a unit composed of the single cell and one or two of the separators that are combined with the single cell may have a flat-plate overall shape. The separator preferably contains a lanthanum-chromium perovskite oxide and rare earth-doped zirconia. Preferably, it consists only of these.

The present teachings may provide a solid oxide fuel cell having the above-described stack structure for the solid oxide fuel cell. The present teachings may also provide a solid oxide fuel cell system provided with the above-described stack structure for the solid oxide fuel cell.

The present teachings may provide a method for manufacturing a laminated solid oxide fuel cell in which single cells each having a fuel electrode layer comprising a fuel electrode and an air electrode layer comprising an air electrode, the fuel electrode layer and the air electrode layer being arranged opposite each other on either side of a solid electrolyte, are stacked with separators in between to separate the single cells, the method includes the steps of: preparing a laminate by repeating the following steps (a) and (b);

(a) preparing a first sheet containing a solid electrolyte material which is a material of the solid electrolyte or a separator material which is a material of the separator;

(b) preparing a second sheet having an electrode material region comprising a fuel electrode material or an air electrode material and a non-porous material region for forming a non-porous seal part that is equivalent to either the solid electrolyte or the separators in terms of at least thermal expansion and contraction characteristics, and laminating this second sheet on the first sheet; and heat treating the laminate.

In the manufacturing method of the present teachings, the non-porous material region of the second sheet preferably has a same composition as the first sheet. This second sheet is preferably prepared by tape casting. The second sheet is also preferably prepared by simultaneously casting the electrode material region and the non-porous material region. An evaporative material layer, which has a pattern of a fuel gas conduit or an air gas conduit and is composed of an evaporative material eliminated by the heat treatment, is preferably provided on the first sheet after the step (a) but before the step (b). The separator material preferably contains a lanthanum-chromium perovskite oxide and rare-earth doped zirconia.

REFERENCE SIGNS LIST

2 Single cell, 4 Solid electrolyte, 6 Fuel electrode layer, 7 Fuel electrode, 8 Air electrode layer, 9 Air electrode, 10*a*, 10*b*, 30*a*, 30*b*, 50*a*, 50*b* Seal parts, 14 Separator, 16, 36 Fuel gas conduits, 17, 37*a*, 37*b* Openings, 18, 38 Air gas conduits, 19, 39*a*, 39*b* Openings, 20, 40, 60 Stack structures

DESCRIPTION OF EMBODIMENTS

The present teachings relate to a stack structure for a laminated SOFC, to a laminated SOFC provided with this stack structure, to an SOFC system provided with this laminated SOFC, to a method for manufacturing a laminated SOFC, and to an electrode sheet with integrated gas seal region and a manufacturing method therefor.

Certain embodiments of the present teachings provide a stack structure provided with a plurality of stacked single cells, each having a fuel electrode layer comprising a fuel electrode and an air electrode layer comprising an air electrode arranged opposite each other on either side of a solid electrolyte, with separators separating the stacked single cells, and provided especially with seal parts that are located within the fuel electrode layer and the air electrode layer, are equivalent to either the separator or the solid electrolyte at least in terms of thermal expansion and contraction characteristics, and are integrated with the edge of the fuel electrode or the edge of the air electrode and also with the adjacent separator and solid electrolyte. The stack structure is formed such that a stream of the fuel gas is supplied to the fuel electrode and a stream of the air gas is supplied to the air electrode. Other embodiments of the present teachings can also be directed to such a stack structure.

With the stack structure of the present teachings, when the features described above are adopted including the seal parts, which are equivalent to the separator or solid electrolyte in terms of thermal expansion and contraction characteristics, passage of fuel gas is separated from passage of air gas by means of the seal parts. With the stack structure of the present teachings, moreover, a structure may be achieved in which a continuous phase of separators and solid electrolytes integrated via seal parts is formed throughout the stacked single cells, with the fuel electrodes and air electrodes filling the spaces in this continuous phase. Consequently, adequate mechanical strength can be easily ensured by laminating to form the stack structure even if the components of each single cell, i.e. the solid electrolyte, fuel electrode and air electrode are all too thin to ensure the strength of the individual single cell. That is, cell supports are not needed to ensure mechanical strength as in an electrolyte-supported or electrode-supported cell, and the various restrictions needed to ensure the strength of the single cell can be avoided or reduced.

Because the seal parts are equivalent to the solid electrolyte or separator in terms of thermal expansion and contraction characteristics, the aforementioned continuous phase will have good heat shock resistance. Further, providing such seal parts in the fuel electrode layer and air electrode layer serves to mitigate the difference in thermal expansion and contraction characteristics between the fuel electrode and air electrode on the one hand and the solid electrolyte and separators on the other, thereby improving heat shock resistance.

Moreover, the internal resistance and thermal expansion coefficient can be fully determined when establishing the thicknesses of the solid electrolyte, fuel electrode and air electrode because these thicknesses are not constrained by the need to ensure the mechanical strength of the single cell. As a result, it may be possible to effectively reduce the internal resistance of the stack structure, and improve the power generating characteristics. It may also be possible to effectively improve the heat shock resistance of the stack structure.

With the stack structure of the present teachings, moreover, stacking is easy because the cells are laminated with seal parts that can separate the streams of fuel gas and air gas are provided within the fuel electrode layer and air electrode layer.

In the method for manufacturing a laminated SOFC of the present teachings, a stack structure of single cells separated by separators can be formed by preparing first sheets each consisting of a solid electrolyte material or separator material and second sheets each having an electrode material region and a seal part material region, and laminating the sheets together. Consequently, it is easy to manufacture the laminated SOFC of the present teachings.

Figure 1:
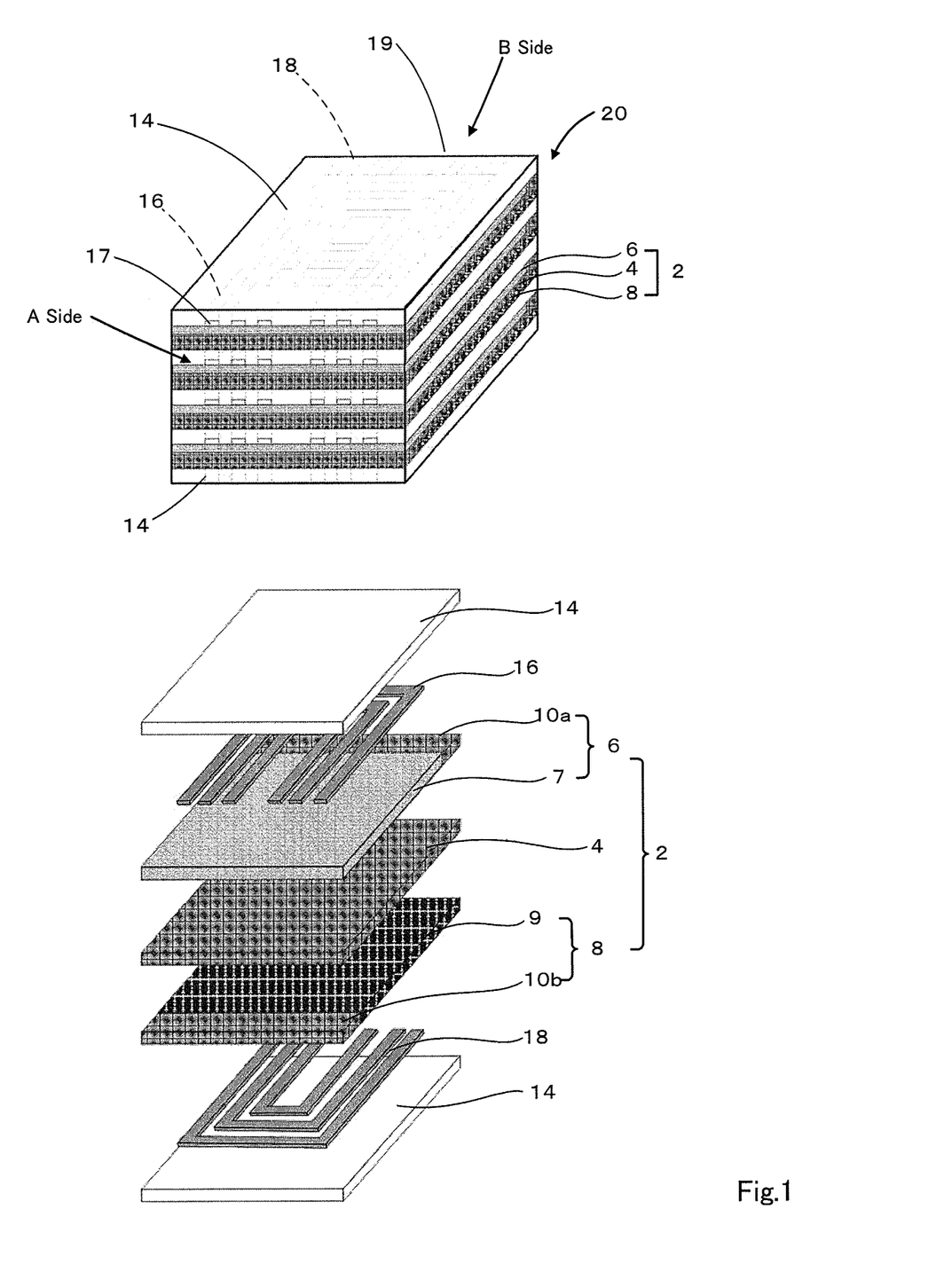
FIG. 1 shows one example of a stack structure for a laminated SOFC of the present teachings.
Figure 2:
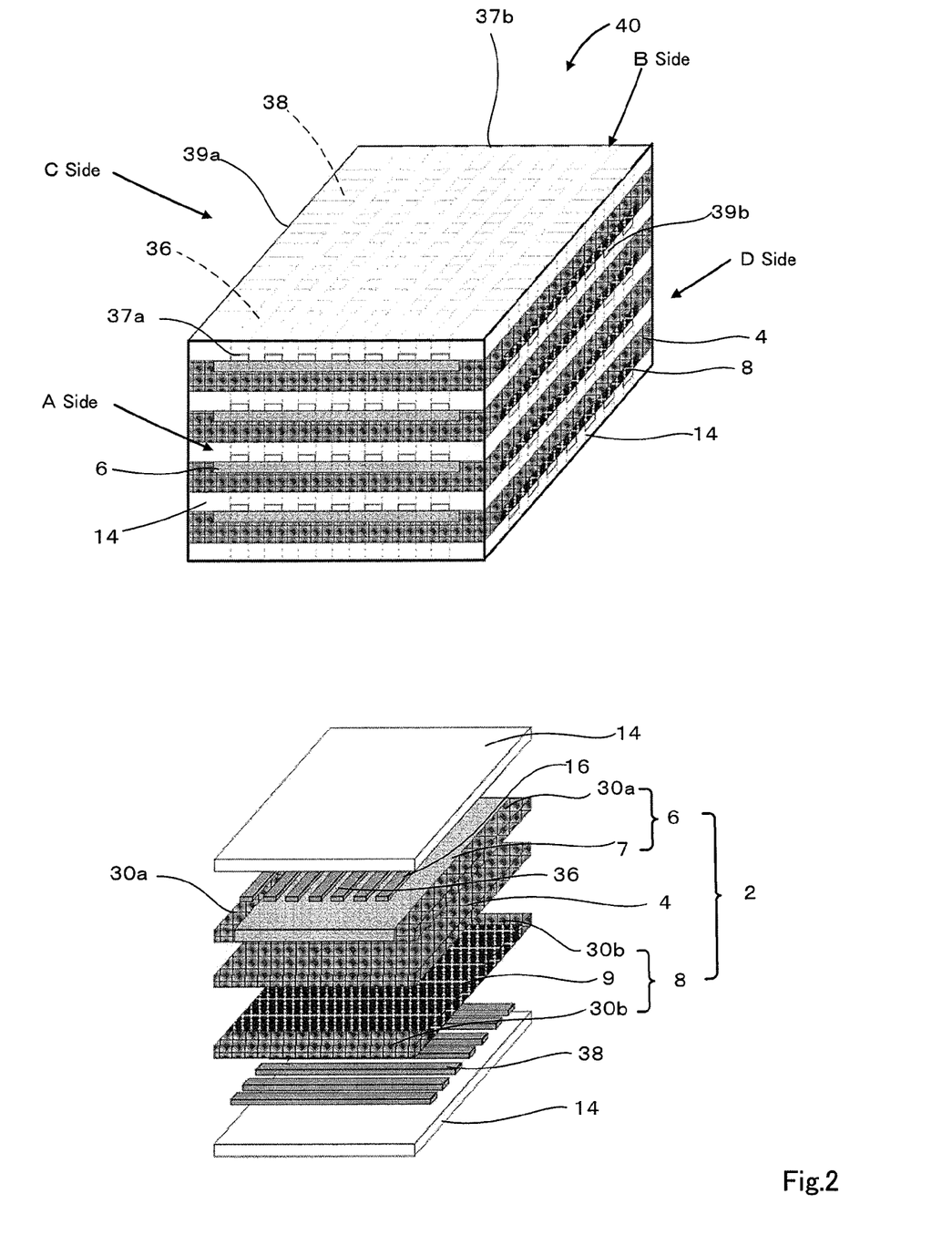
FIG. 2 shows another example of the stack structure for the laminated SOFC of the present teachings.
Figure 3:
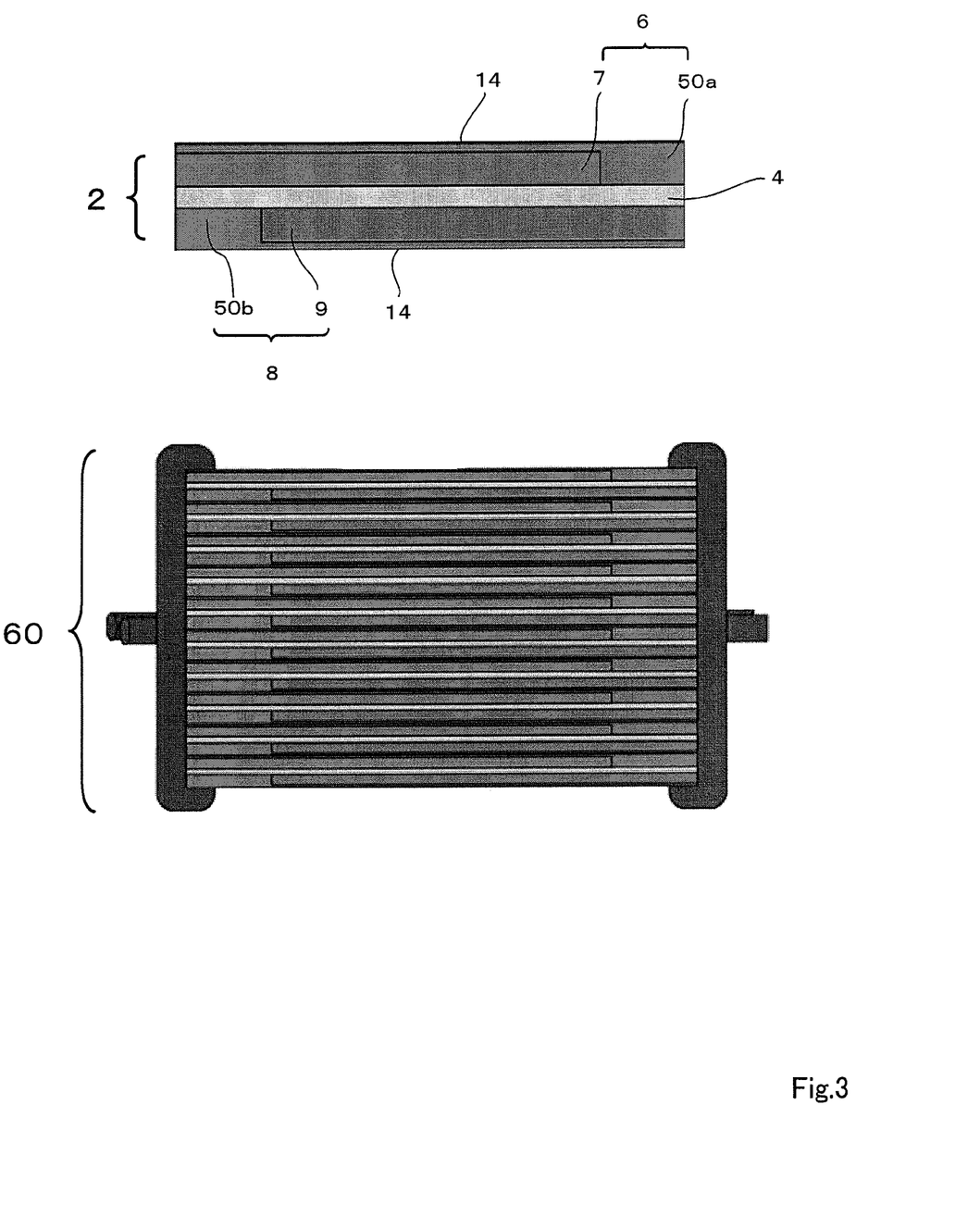
FIG. 3 shows another example of the stack structure for the laminated SOFC of the present teachings.
Figure 4:
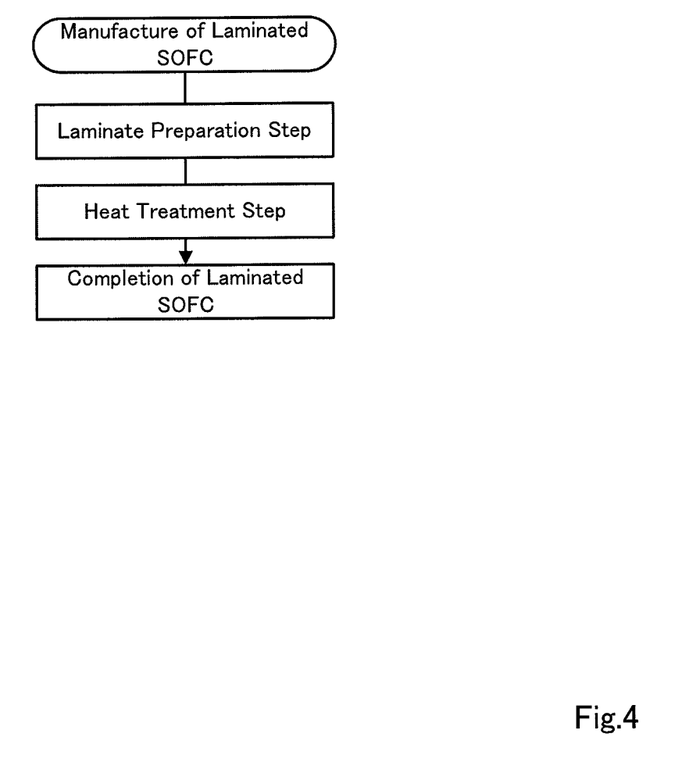
FIG. 4 shows a manufacturing process for the stack structure for the laminated SOFC of the present teachings.

The various embodiments of the present teachings are explained below with reference to the relevant drawings. FIG. 1 shows one example of the stack structure for laminated SOFCs of the present teachings, FIG. 2 shows another example, FIG. 3 shows still another example, and FIG. 4 shows one example of the SOFC manufacturing process of the present teachings. Elements that are common to these drawings are explained using the same symbols. The stack structure for laminated SOFCs shown in these drawings is only one example of the stack structure of the present teachings, and the present teachings is not limited thereby. The same applies to the SOFC manufacturing process.

(Stack Structure for Laminated SOFC)

The stack structure of the present teachings may take various forms, but hereinbelow the stack structure of the present teachings is explained with reference to FIGS. 1 through 3.

A stack structure 20 shown in FIG. 1 is provided with single cells 2, separators 14, which are placed between stacked single cells 2 to separate single cells 2, fuel gas conduits 16 for supplying fuel gas to fuel electrodes 7, and air gas conduits 18 for supplying air gas to air electrodes 9. As shown in FIG. 1, each single cell 2 comprises a solid electrolyte 4, a fuel electrode layer 6 and an air electrode layer 8. The single cells 2 in the present teachings are neither electrolyte supported nor electrode supported. In the single cell 2 in the stack structure 20 of the present teachings, the thicknesses of the fuel electrode layer 6 and air electrode layer 8 may e.g. each be at least 30% but no more than 300% of the thickness of the solid electrolyte 4. Within this range, warpage and peeling are unlikely to occur during firing.

The solid electrolyte 4 is formed as a layer having a planar form similar to the planar form of the stack structure 20. The planar form may be square, rectangular, circular or some other form depending on the shape of the stack structure 20. The solid electrolyte 4 may be a known electrolyte commonly used in SOFCs. Examples include ceria oxides doped with samarium or gadolinium, lanthanum-gallate oxides doped with strontium or magnesium, zirconia oxides containing scandium or yttrium and other oxide ion conducting ceramics materials.

The thermal expansion coefficient (between 20° C. to 1000° C.) of the solid electrolyte 4 is preferably between $10 \times 10^{-6}$ $K^{-1}$ and $12 \times 10^{-6}$ $K^{-1}$. Within this range, peeling and cracking are unlikely to occur during firing. $10.5 \times 10^{-6}$ $K^{-1}$ to $11.5 \times 10^{-6}$ $K^{-1}$ is more desirable considering the residual stress of the stack structure.

The thickness of the solid electrolyte 4 is not particularly limited, but can be at least 1 μm but no more than 150 μm. Within this range, suitable mechanical strength and power generating characteristics can be obtained when the single cell 2 is formed with the fuel electrode layer 6 and air electrode layer 8 as described below, and when the stack structure 20 is formed with the separators 14. At least 1 μm but no more than 100 μm is more desirable, at least 1 μm but no more than 40 μm is still more desirable, and at least 1 μm but no more than 20 μm is especially desirable.

The fuel electrode layer 6 contains a fuel electrode 7. For the fuel electrode material composing the fuel electrode 7, materials used as the fuel electrode materials in well-known SOFCs can be used without any particular limitations. Examples include mixtures of metal catalysts with ceramic powder materials consisting of oxide-ion conductors, and composite powders thereof. Examples of metal catalysts that can be used in this case include nickel, iron, cobalt, precious metals (platinum, ruthenium, palladium and the like) and other materials that are stable in reducing atmospheres and have hydrogen oxidation activity. Oxide-ion conductors having fluorite type structures or perovskite structures can be used by preference as oxide-ion conductors. Examples of those having fluorite type structures include ceria oxides doped with samarium or gadolinium, zirconia oxides doped with scandium or yttrium and the like. Examples of those having perovskite structures include lanthanum-gallate oxides doped with strontium or magnesium and the like. Of these materials, the fuel electrode 7 is preferably formed from a mixture of nickel and an oxide-ion conductor. Of the aforementioned ceramic materials, one may be used alone or a mixture of two or more can be used. The fuel electrode 7 can also be composed of a metal catalyst by itself. The average particle diameter of the fuel electrode material is preferably at least 10 nm but no more than 100 μm, or more preferably at least 50 nm but no more than 50 μm, or still more preferably at least 100 nm but no more than 10 μm. The average particle diameter can be measured e.g. in accordance with JIS R1619. Like the solid electrolyte 4, the fuel electrode layer 6 can be formed as a layer in accordance with the planar shape of the stack structure 20.

The thermal expansion coefficient (between 20° C. to 1000° C.) of the fuel electrode layer 6 is preferably at least $10 \times 10^{-6}$ $K^{-1}$ but no more than $12.5 \times 10^{-6}$ $K^{-1}$. Within this range, peeling is unlikely to occur at the boundary with the solid electrolyte. At least $10 \times 10^{-6}$ $K^{-1}$ but no more than $12 \times 10^{-6}$ $K^{-1}$ is more desirable taking into consideration the residual stress of the stack structure. The thickness of the fuel electrode layer 6 is not particularly limited, but is preferably at least 1 μm but no more than 150 μm. Within this range, suitable mechanical strength and power generating characteristics can be obtained when configuring the single cell 2 and when configuring the stack structure 20 together with the separators 14. At least 1 μm but no more than 100 μm is preferable, at least 5 μm but no more than 40 μm is more preferable, and at least 5 μm but no more than 20 μm is still more preferable. In addition to the fuel electrode 7, the fuel electrode layer 6 comprises a seal part 10a, which is discussed below.

The air electrode layer 8 contains an air electrode 9. Materials used as the air electrode materials in solid oxide fuel cells can be used for the air electrode material composing the air electrode 9, without any particular limitations. For example, metal oxides with perovskite structures and the like made up of Co, Fe, Ni, Cr or Mn or the like can be used. Specific examples include $(Sm,Sr)CoO_3$, $(La,Sr)MnO_3$, $(La,Sr)CoO_3$, $(La,Sr)(Fe,Co)O_3$ and $(La,Sr)(Fe,Co,Ni)O_3$ oxides and the like. $(La,Sr)MnO_3$ is preferred. One of the aforementioned ceramic materials can be used alone, or two or more may be used in combination. The average particle size of a powder of the air electrode material is preferably at least 10 nm but no more than 100 μm, or more preferably at least 50 nm but no more than 50 μm, or still more preferably at least 100 nm but no more than 10 μm.

The thermal expansion coefficient (between 20° C. to 1000° C.) of air electrode layer 8 is preferably at least $10 \times 10^{-6}$ $K^{-1}$ but no more than $15 \times 10^{-6}$ $K^{-1}$. Within this range, peeling is unlikely to occur at the boundary with the solid electrolyte. At least $10 \times 10^{-6}$ $K^{-1}$ but no more than $12 \times 10^{-6}$ $K^{-1}$ is preferred from the standpoint of the residual stress of the stack structure. The thickness of the air electrode layer 8 is not particularly limited, but is preferably at least 1 μm but no more than 150 μm. Within this range, suitable mechanical strength and power generating characteristics can be obtained when configuring the single cell 2 and then when configuring the stack structure 20 with the separators 14. At least 1 μm but no more than 100 μm is preferred, at least 5 μm but no more than 40 μm is more preferred, and at least 5 μm but no more than 20 μm is especially preferred. In addition to the air electrode 9, the air electrode layer 8 comprises a seal part 10b, which is discussed below.

The thicknesses of the solid electrolyte 4, air electrode layer 6 and fuel electrode layer 8 are preferably all at least 1 μm but no more than 150 μm. If all these elements are within this range of thickness, differences in the thermal expansion and contraction characteristics during firing or use can be adjusted without any great restrictions when integrating these elements to form a single cell. Because such integrated single cells can be formed in this way, it is easy to ensure the strength of a stack structure formed by laminating these single cells. More preferably, all elements are at least 1 μm but no more than 100 μm thick. Still more preferably they are no more than 40 μm thick, and ideally they are no more than 20 μm thick. In this Description, average particle sizes are measured e.g. in accordance with JIS R1619.

In the stack structure 20, a plurality of single cells 2 are laminated with the separators 14 separating the single cells. The separators 14 are preferably in a flat-plate form that can be laminated in the same way as the solid electrolyte 4, fuel electrode layer 6 and air electrode layer 8. This is because such flat separators are easy to prepare and do not necessitate a complex lamination process in order to obtain the stack structure 20. Various known conductive materials used as SOFC separators can be used as the material of the separators 14. In addition to stainless metal materials, e.g., lanthanum chromite metal ceramics can also be used.

As discussed below, the various components of the single cells and separators 14 are preferably fired together and then co-sintered to obtain the stack structure 20 of the present teachings. In this embodiment, the separators 14 are preferably made of a ceramic material that is sintered at relatively low temperatures. For purposes of improving sinterability, lanthanum-chromium oxide ($LaCrO_3$), lanthanum-strontium-chromium oxide ($La_{(1-x)}Sr_xCrO_3$, $0<x\leq0.5$) and other lanthanum-chromium perovskite oxides, or ceramics comprising such lanthanum-chromium perovskite oxides and rare-earth doped zirconia, are preferably used as such ceramic materials. The lanthanum-chromium perovskite oxide can be sintered more densely and at a lower temperature than in the past if rare earth-doped zirconia (general formula $(1-x)ZrO_2 \cdot xY_2O_3$, wherein Y is a rare earth element and $0.02 \leq x \leq 0.20$) is included during firing. As a result, the separators can be densified at a temperature of no more than about 1400° C., which is low enough to allow co-sintering of the cell components. Such a lanthanum-chromium perovskite oxide can also be doped with other metal elements.

Examples of the rare earth element in the rare earth doped zirconia include yttrium (Y), scandium (S), ytterbium (Yb), cerium (Ce), neodymium (Nd), samarium (Sm) and the like, of which yttrium (Y), scandium (Sc) and ytterbium (Yb) are preferred, and yttrium (Y) is especially preferred. The x in the rare earth doped zirconia (general formula $(1-x)ZrO_2 \cdot xY_2O_3$, where Y is a rare earth element) is preferably at least 0.02 but no more than 0.2, or more preferably at least 0.02 but no more than 0.1.

The thermal expansion coefficient (between 20° C. to 1000° C.) of the separator 14 is preferably at least $8 \times 10^{-6}$ K$^{-1}$ but no more than $12 \times 10^{-6}$ K$^{-1}$. Within this range, it is possible to control peeling with the air electrode layer or fuel electrode layer. Considering the residual stress of the stack structure, at least $9.5 \times 10^{-6}$ K$^{-1}$ but no more than $11.5 \times 10^{-6}$ K$^{-1}$ is especially preferred. The thickness of the separator 14 is not particularly limited, but is preferably at least 1 μm but no more than 200 μm. Within this range, suitable mechanical strength and power generating characteristics can be obtained when the single cells 2 are stacked with separation to configure the stack structure 20. At least 10 μm but no more than 50 μm is preferred, and at least 10 μm but no more than 40 μm is more preferred.

The thickness of each of the layers, including the separators 14 and the components of the single cells, is preferably no more than 100 μm.

(Seal Part in Fuel Electrode Layer)

The fuel electrode layer 6 is provided with the seal part 10a in addition to the fuel electrode 7. The fuel electrode layer 6 has the seal part 10a within the range of thickness of the fuel electrode layer 6. Preferably, it has a seal part 10a with a thickness matching that of the fuel electrode layer 6. The seal part 10a is integrated on the edge of the fuel electrode 7, with the entirety thereof constituting the fuel electrode layer 6. The seal part 10a is formed with sufficient non-porosity to provide gas-tightness at least with respect to air gas and fuel gas as required in the SOFC, and is formed so as to allow independent streams of the fuel gas and air gas so that fuel electrode 7 of fuel electrode layer 6 is not exposed to the air gas supplied to its counter-electrode, the air electrode 9. Consequently, where the seal is formed on the edge of the fuel electrode 7 depends on the patterns of a fuel gas conduit 16 and an air gas conduit 18, and on the arrangement of these two supply parts 16 and 18 within the stack structure 20. More specifically, the seal part 10a is formed on the edge on the same side as an opening 19 of the air gas supply part 18, to prevent exposure of the fuel electrode 7 to the air gas.

In the embodiment shown in FIG. 1, the fuel gas conduit 16 and air gas conduit 18 both have a pattern of a plurality of u-shaped channels, with openings 17 and openings 19 opening, respectively, only on a surface A and a surface B on opposite sides of the stack structure 20. Consequently, in the embodiment shown in FIG. 1 the edge of the fuel electrode layer 6 having the seal part 10a is the edge of the fuel electrode 7 on the surface B of the stack structure 20.

For example, when the fuel gas conduit 36 and the air gas conduit 38 are straight as in the stack structure 40 shown in FIG. 2, the gas openings 37a and 37b open onto opposing surfaces of the stack structure 40, as do the openings 39a and 39b. That is, the openings 39a, 39b open onto a surface C and a surface D of the structure 40. For this reason, the seal parts 30a are provided integrally on the edge of the fuel electrode 7 on the C and D surfaces of the stack structure 40.

The seal part 10a is formed so as to be equivalent to the separator 14 or solid electrolyte 4 at least in terms of the thermal expansion and contraction characteristics. Accordingly, differences in the thermal expansion and contraction characteristics between the materials to be laminated are avoided when separating the single cells with the separators 14 or when configuring the single cell 2 with the fuel electrode layer 6, and it is possible to obtain a stack structure 20 with excellent integrity and heat shock resistance. The thermal expansion and contraction characteristics include at least the thermal expansion coefficient. "Equivalent" means that the thermal expansion and contraction characteristics are the same as those of the separator 14 or solid electrolyte 4, or are within a range that does not greatly affect the integrity of the stack structure 20 within the range of temperatures applied to the SOFC during preparation and operation of the SOFC. Experiments by the inventors have shown that the integrity of the stack structure 20 will not be greatly affected if the thermal expansion coefficient is at least 0.85 times but no more than about 1.18 times the thermal expansion coefficient of the separator 14 or solid electrolyte 4.

The thermal expansion and contraction characteristics of the seal part 10a may be equivalent to those of one of the separator 14 and solid electrolyte 4. If they are equivalent to one or the other, peeling can be avoided at the boundary between the seal part and either the separator 14 or solid electrolyte 4. Depending on the thermal expansion coefficients of the separator 14 and solid electrolyte 4, the thermal expansion and contraction characteristics of the seal part 10a may be equivalent to the thermal expansion and contraction characteristics of both the solid electrolyte 4 and separator 14. This is most desirable from the standpoint of improving the mechanical strength and heat shock resistance of the stack structure 20.

The seal part 10a preferably has the same composition as one of the separator 14 or solid electrolyte 4. With the same composition, good integration can be achieved when the seal is integrated with one of these, improving the heat shock resistance of the stack structure 20 as well as the mechanical strength. When the seal part 10a has the same composition as one of the separator 14 or solid electrolyte 4, the seal part 10a may actually comprise a part of one of the separator 14 or solid electrolyte 4, or consist of such a part. This means in other words that the seal part 10a is composed of that the part of the separator 14 or solid electrolyte 4 that extends into the fuel electrode layer 6, which is a part excluding a part thereof that has reached into the fuel electrode 7.

For example, in the stack structure 20 shown in FIG. 1 and the stack structure 40 shown in FIG. 2, the seal parts 10a and 30a each have the same composition as the solid electrolyte 4, and consist of a part of the solid electrolyte 4. The seal part 50a of the stack structure 60 shown in FIG. 3 has the same composition as the separator 4, and consists of a part of the separator 4.

As shown in FIG. 2, when the seal parts 30a and 30b are provided at the edges on both sides of the fuel electrode 7 and air electrode 9 of the fuel electrode layer 6 and air electrode layer 8, the thermal expansion and contraction characteristics of the seal part 30a can be equivalent to those of one of the separator 14 and solid electrolyte 4. If they are equivalent to one or the other, peeling can be prevented at the boundary between the seal part and the separator 14 or solid electrolyte 4. Depending on the thermal expansion coefficients of the separator 14 and solid electrolyte 4, the thermal expansion characteristics of the seal parts 30a may be equivalent to the thermal expansion and contraction characteristics of both the solid electrolyte 4 and separator 14. This is most desirable from the standpoint of improving the mechanical strength and heat shock resistance of the stack structure 40.

(Seal Part in Air Electrode Layer)

The air electrode layer 8 is provided with the seal part 10b in addition to the air electrode 9. The air electrode layer 8 has the seal part 10b within the range of thickness of the air electrode layer 8. Preferably, it has the seal part 10b with a thickness matching that of the air electrode layer 8. Like the seal part 10a, the seal part 10b is integrated on the edge of the air electrode 7, with the whole composing the air electrode layer 8. The seal part 10b is formed so as to avoid exposure of the air electrode 9 to fuel gas, and ensure the independent passage of fuel gas and air gas. The seal part 10b can take the same form as the seal part 10a except that the seal part 10b prevents exposure of the air electrode 9 to the fuel gas, while the seal part 10a prevents exposure of the fuel electrode 9 to the air gas. That is, it is possible to apply the various features explained above with respect to the non-porosity of the seal part 10a, air electrode layer 8 and the thermal expansion coefficient.

The seal part 10b may also have the same composition as one of the solid electrolyte 4 and separator 14, or may comprise a part thereof, but when the seal part 10a is the same as or constitutes a part of one of these, the seal part 10b is preferably composed in the same way as the seal part 10a. In this configuration, it is possible to prevent deformation of the stack structure by thermal expansion and contraction of the seal parts.

As in the case of the seal part 10a, the location of the seal part 10b in the air electrode 9 or stack structure 20 depends on the patterns of the fuel gas conduit 16 and air gas conduit 18, and on the arrangement of these two supply parts 16 and 18 within the stack structure 20. Specifically, the seal part 10b is formed on the edge on the same side as the opening 17 of the fuel gas supply part 16, to prevent exposure of the air electrode 9 to the fuel gas.

In the embodiment shown in FIG. 1, the fuel gas conduit 16 and air gas conduit 18 both have a pattern of a plurality of u-shaped channels, with the openings 17 and openings 19 opening, respectively, only on the surface A and surface B on opposite sides of the stack structure 20. Consequently, in the embodiment shown in FIG. 1 the edge of the air electrode layer 8 having the seal part 10b is the edge of the air electrode 9 on the surface A of the stack structure 20.

For example, in the stack structure 40 shown in FIG. 2, the fuel gas openings 37a, 37b open onto the A and B sides of structure 40. Consequently, the seal parts 30b are integrally provided on the edges of the air electrode 9 on the A and B sides of the stack structure 40.

The laminated SOFC of the present teachings can be composed of the stack structure of any of the various modes explained above. For example, a laminated SOFC can be configured by adding suitable elements for current collection known to those skilled in the art to the stack structure thus constructed.

(Gas Conduit)

As shown in FIG. 1, a single cell 2 of the stack structure 20 is provided with the fuel gas conduit 16 for supplying the fuel gas to the fuel electrode 7 and the air gas conduit 18 for supplying the air gas to the air electrode 9. The patterns and forms of these gas conduits 16 and 18 are not particularly limited. In addition to the u-shaped form shown in FIG. 1 and the straight form shown in FIG. 2, examples may include zigzag, radial, spiral and various other patterns. Other known forms may also be applied to these gas conduits in the SOFC. These supply parts 16 and 18 are preferably hollow channels, and are preferably formed alongside the separator 14. In the stack structure 20 of the present teachings, as shown in FIG. 1, these gas conduits 16 and 18 have the pattern of u-shaped channels, with the openings 17 and 19 preferably opening only on opposite sides of the stack structure 20. This is because this allows the seal parts 10a and 10b to be formed, respectively, in the fuel electrode layer 6 and air electrode layer 8 only on the surface with the gas channel opening that needs to be avoided.

As shown in FIG. 1, in the stack structure 20 of the present teachings, a unit consisting of a single cell 2 combined with one or two separators 14 preferably has a flat-plate overall shape. With this structure of laminated flat plates, the stack structure 20 as a whole can be configured as a pillar, making it easier to obtain good mechanical strength because stress is less likely to be concentrated in certain areas. The stack structure 20 can also be obtained with little peeling or breakage even if there is residual stress or the like due to differences in thermal expansion coefficient. In addition, the manufacturing process of the laminated SOFC can be facilitated.

The channel forms of the fuel gas conduit 16 and air gas conduit 18 may be the same or different throughout all single cells 2. For example, a stack structure 20 having both u-shaped channels and straight channels is not excluded.

The number of the single cells 2 formed by lamination in the stack structure 20 is not particularly limited. They are preferably laminated so as to achieve the necessary mechanical strength.

(Laminated SOFC)

The laminated SOFC of the present teachings can be provided with the stack structure of the present teachings. The stack structure of the present teachings can be provided as necessary with suitable parts such as a gas supply system for supplying the fuel gas and air gas from a supply source to the stack structure, a current collector, a casing and the like to construct a laminated SOFC.

(SOFC System)

The SOFC system of the present teachings can be provided with the laminated SOFC of the present teachings. A single laminated SOFC can be used, but ordinarily one or a plurality of modules each combining a plurality of laminated SOFCs are provided so as to yield the desired power output. The SOFC system can also be provided with known SOFC system elements such as a fuel gas reformer, heat exchanger, turbine and the like.

(Method for Manufacturing Laminated SOFC)

Figure 5:
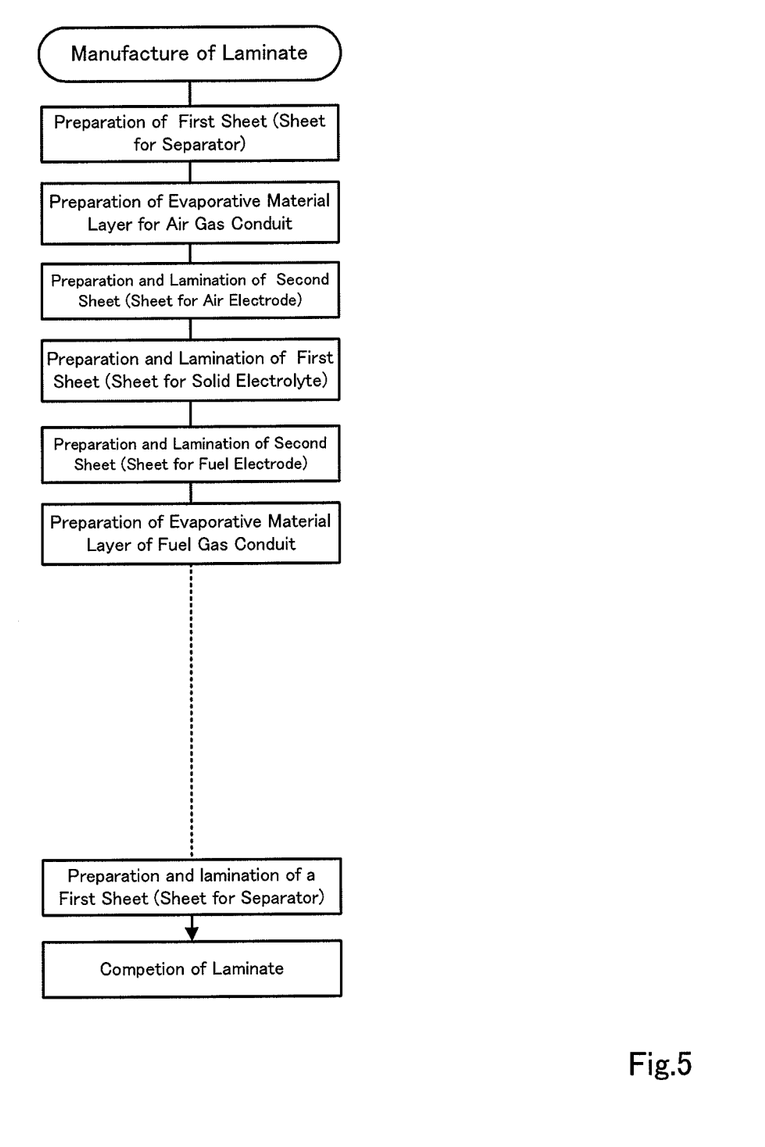
FIG. 5 shows one example of the manufacturing process for the stack structure for the laminated SOFC of the present teachings.

As shown in FIG. 4, the method for manufacturing the laminated SOFC of the present teachings comprises a step of preparing a laminate as a precursor for the stack structure, and a step of heat-treating the laminate. FIG. 5 describes one example of this manufacturing process.

(Laminate Preparation Step)

The laminate preparation step is a step of preparing first sheets comprising a solid electrolyte material as the material of the solid electrolyte or a separator material as the material of the separator, preparing second sheets having an electrode material region comprising the fuel electrode material or air electrode material and a seal material region for forming a non-porous seal part equivalent at least in terms of thermal expansion and contraction characteristics to the aforementioned solid electrolyte or separator, and laminating these second sheets onto the first sheets repeatedly to prepare a laminate. Since the laminate here is the precursor of the stack structure, it is laminated with the single cells being separated by the separators.

In the manufacturing process shown in FIG. 5, an evaporative material layer for forming the air gas conduit is formed on a first sheet comprising the separator material, after which a second sheet having the electrode material region consisting of the air electrode material and the seal material region consisting of the solid electrolyte material is laminated. The first sheet comprising the separator material can be obtained by making the separator material explained above into a sheet by ordinary methods. Both the first and second sheets are sheets of unfired ceramics that will be converted to the desired ceramics by heat treatment after lamination. Such a first sheet can be obtained for example by a casting method such as tape casting in which a knife coater, doctor blade or other applicator is used to sheet mold a slurry consisting principally of a separator material with binder resin, organic solvent and the like added in suitable amounts. The resulting sheet is first dried by ordinary methods and then heat treated as necessary to obtain a first sheet (unfired ceramic green sheet).

A ceramic powder comprising a lanthanum-chromium perovskite oxide and rare earth-doped zirconia is preferably used for the separator material. Including rare earth-doped zirconia allows the lanthanum-chromium perovskite oxide to be densely sintered even at a firing temperature of no more than about 1400° C., which means that it can be co-sintered with the cell components. High electrical conductivity can also be maintained. In this material, the rare earth-doped zirconia preferably constitutes at least 0.05 mass % but no more than 10 mass % of the lanthanum-chromium perovskite oxide ceramic. Below 0.05 mass %, the sintering temperature will not be lowered sufficiently, while above 10 mass % conductivity may be adversely affected.

Next, the second sheet is prepared. The second sheet is provided with the air electrode material region and the seal material region consisting of the solid electrolyte material. The arrangement of the air electrode material region and seal material region is determined by the design concept of the seal part as explained previously with respect to the laminated SOFC of the present teachings. Such a sheet of different regions can be obtained by a method of sheet molding by means of dip casting or other casting using a doctor blade or other applicator. That is, slurries of different compositions are discharged simultaneously in the casting direction, and applied in such a way that the different slurry regions can be integrated without being mixed after casting. Integral application of these regions of different compositions can be achieved by adjusting the fluidity of the slurries for forming the different regions. The resulting casted product can be dried by ordinary methods and heat-treated as necessary to obtain the second sheet.

The slurry for the air electrode material region can be obtained by making the air electrode material described above into a slurry by ordinary methods. A foaming material or the like can be added as necessary to the slurry for the air electrode material region. A suitable slurry using the solid electrolyte material is used for the seal material region in this case, and this can be used for casting.

The second sheet is laminated onto the first sheet prepared in this way. The alignment of the second sheet relative to the first sheet is such that the fuel electrode material region and seal material region are arranged in accordance with the desired stack structure. When laminating the second sheet for the air electrode or other electrode onto the first sheet consisting of separator material, an evaporative material layer patterned to form the gas conduit is preferably applied before laminating the second sheet. A pipe structure that allows passages of gas is formed by heat treatment when the evaporative material layer is composed of the material that is eliminated in the heat treatment step. The gas supply structure can be easily formed if the patterns are the patterns of the fuel gas and air gas conduits. By preparing the gas conduits in this way, pipe structures can be constructed without complicating the lamination process or affecting the mechanical strength and the like of the stack structure.

Once the first and second sheets have been laminated, another first sheet is prepared, and another second sheet is laminated on this first sheet. For example, in the example shown in FIG. 5, a first sheet consisting of the solid electrolyte material is prepared, and a second sheet having the fuel electrode material region and the seal material region is prepared. The solid electrolyte material and fuel electrode material described above can be made into slurries for the solid electrolyte material and fuel electrode material slurries. A foaming agent or the like can be included as necessary in the fuel electrode material in order to ensure porosity after heat treatment.

The types of first sheet and second sheet to be laminated are determined according to the final stack structure to be obtained (structure of single cells separated by separators). The same applies to the orientation of the sheets during lamination. The lamination sequence in the lamination process can be any that yields a stack structure, without any particular limitations. For example, the first sheets and second sheets can be laminated one after the other, or partial laminates can be prepared and then laminated together.

The composition and arrangement of the seal material region in the second sheet can be as explained previously with respect to the stack structure of the present teachings. The various features explained with respect to the stack structure of the present teachings can also be applied to the gas conduit.

(Heat Treatment Step)

The heat treatment step is a step of heat-treating the laminate obtained in the laminating step as a precursor for the stack structure. Heat treatment is performed so as to sinter at least part of the ceramic materials composing the laminate and obtain the desired dense or porous fired body. Preferably, the separator and all the cell components are co-sintered. Heat treatment can be performed for example at a temperature of at least 1250° C. but no more than 1550° C., or preferably at least 1300° C. but no more than 1500° C. At least 1300° C. but no more than 1400° C. is still more desirable. Firing can be performed in air.

The sheets composing the laminate are integrated by this heat treatment to yield the stack structure of the present teachings. That is, a stack structure in which the single cells are separated by separators and parts functioning as seal parts are integrated with the fuel electrode layers or air electrode layers of the single cells can be obtained all at once.

As described above, with the manufacturing method of the present teachings it is possible to obtain the stack structure all at once by preparing and laminating the sheets corresponding to the separator, solid electrolyte, fuel electrode layer and air electrode layer in the stack structure. That is, it is easy to obtain a stack structure of the present teachings having various advantages.

One embodiment of the present teachings was explained above, but the present teachings is not limited thereby, and various changes are possible to the extent that they do not deviate from the intent of the present teachings.

(Electrode Sheet for Laminated SOFC)

An electrode sheet for the laminated SOFC of the present teachings can have an electrode material region comprising a fuel electrode material or air electrode material, and a seal material region for forming a non-porous seal part in the laminated SOFC. With the sheet of the present teachings, a seal structure can be provided easily and reliably because a seal part can be formed within either the fuel electrode layer or air electrode layer. In particular, because the seal material region is equivalent at least in terms of thermal expansion and contraction characteristics to the solid electrolyte or separator of the laminated SOFC, it has good integrity with the adjacent separator or solid electrolyte, resulting in a stack structure with excellent mechanical strength.

The various forms for the fuel electrode, air electrode, separator, solid electrolyte and seal part explained above with respect to the stack structure of the present teachings may be applied to the electrode sheets of the present teachings. The manufacturing method for the second sheet explained above with respect to the laminated SOFC of the present teachings can be applied to manufacturing the electrode sheet of the present teachings.

The present teachings is explained in detail below using examples, but the present teachings is not limited to these examples.

Example 1

In this example, Ni/8YSZ cermet (Ni:8YSZ=80:20 (mole ratio)) was used for the fuel electrode, $La_{0.8}Sr_{0.2}MnO_3$ (LSM) for the air electrode, 8YSZ for the electrolyte, and $La_{0.79}Ca_{0.06}Sr_{0.15}CrO_x$ (LCaSCr) for the separator. Slurries of each were prepared, and the separator sheet and solid electrolyte sheet were prepared by tape casting as green sheets 20 μm to 80 μm thick. For the air electrode sheet, a 20 μm-thick green sheet was prepared having an air electrode material region with a seal material region consisting of separator material at one end. For the fuel electrode sheet, a 20 μm-thick green sheet was prepared having a fuel electrode region with a seal material region consisting of separator material at one end. The slurry concentrations were adjusted for each sheet to obtain uniform shrinkage of the green sheets during heat treatment.

Figure 6:
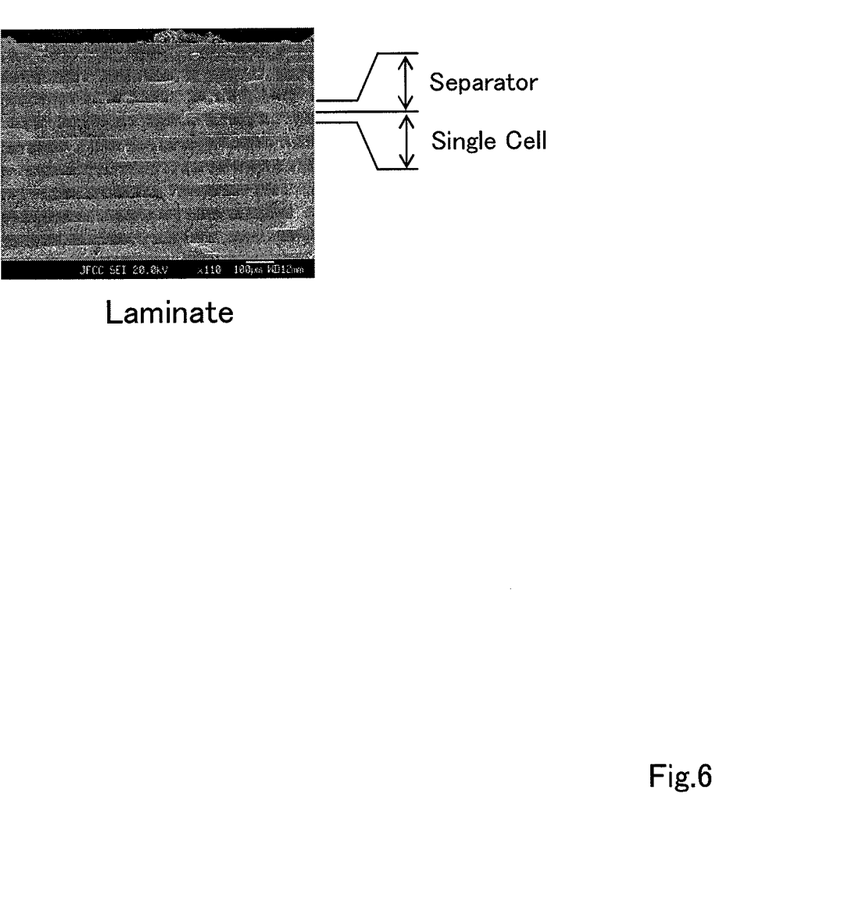
FIG. 6 shows a cross-section of a structure obtained by firing.

These sheets were laminated as shown in FIG. 6, and fired in air at 1400° C. The resulting structure was integrated without warpage, resulting in a highly integrated structure with no peeling between layers. In the resulting structure, the fuel electrode layer, air electrode layer and solid electrolyte were each about 15 μm.

From these results, it can be seen that a good laminated structure without warpage can be obtained by laminating and firing the various sheets used in the example.

Figure 7:
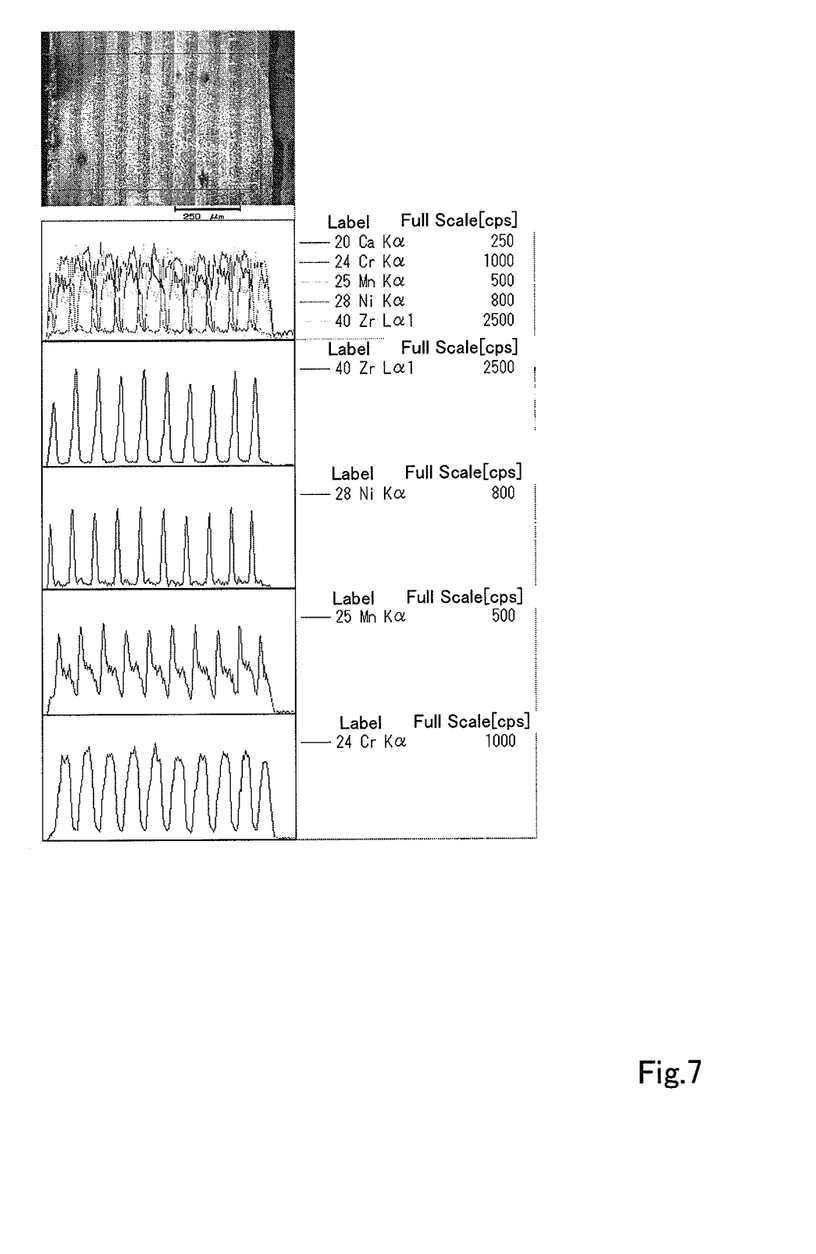
FIG. 7 shows results of EDX evaluation of compositions of the cross-sections of the structures obtained by the firing.

The composition of a cross-section of the fired structure was confirmed by energy dispersive x-ray spectroscopy (EDX). The results are shown in FIG. 7. This shows that layers were formed with the intended compositions for the separator, air electrode, solid electrolyte and fuel electrode.

Example 2

In this example, carbon paste was screen printed when laminating the separator sheet to the air electrode sheet and the separator sheet to the fuel electrode sheet in Example 1, and firing was performed as in Example 1. The resulting structure was shown to have spaces formed in the regions where carbon paste was applied, while still maintaining overall integrity as a structure. This shows that fine gas channels can be formed using an evaporative material.

Example 3

In this example, LaCaSCr powder was compounded with 3YSZ (3 mole % yttrium-stabilized zirconia) in amounts of 1%, 2%, 3%, 4%, 5% and 7% of the mass of the oxide powder and roughly 10 mass % calcium nitrate in addition to these oxide powders, and mixed well in a mortar. This mixed powder was molded in a uniaxial press (1300 kgf/cm$^2$, 5 minutes), and fired for 5 hours in atmosphere at 1300° C. A comparative example was also prepared by the same operations but with no 3YSZ added (sample with 0 mass % calcium nitrate-containing 3YSZ).

Figure 8:
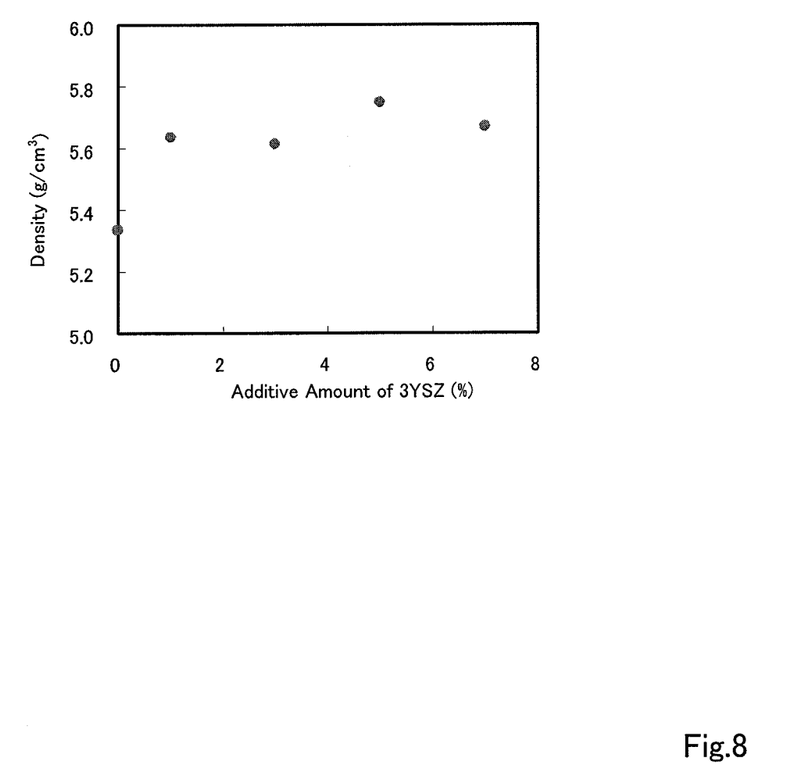
FIG. 8 shows measurement results for density of sintered bodies obtained by firing.
Figure 9:
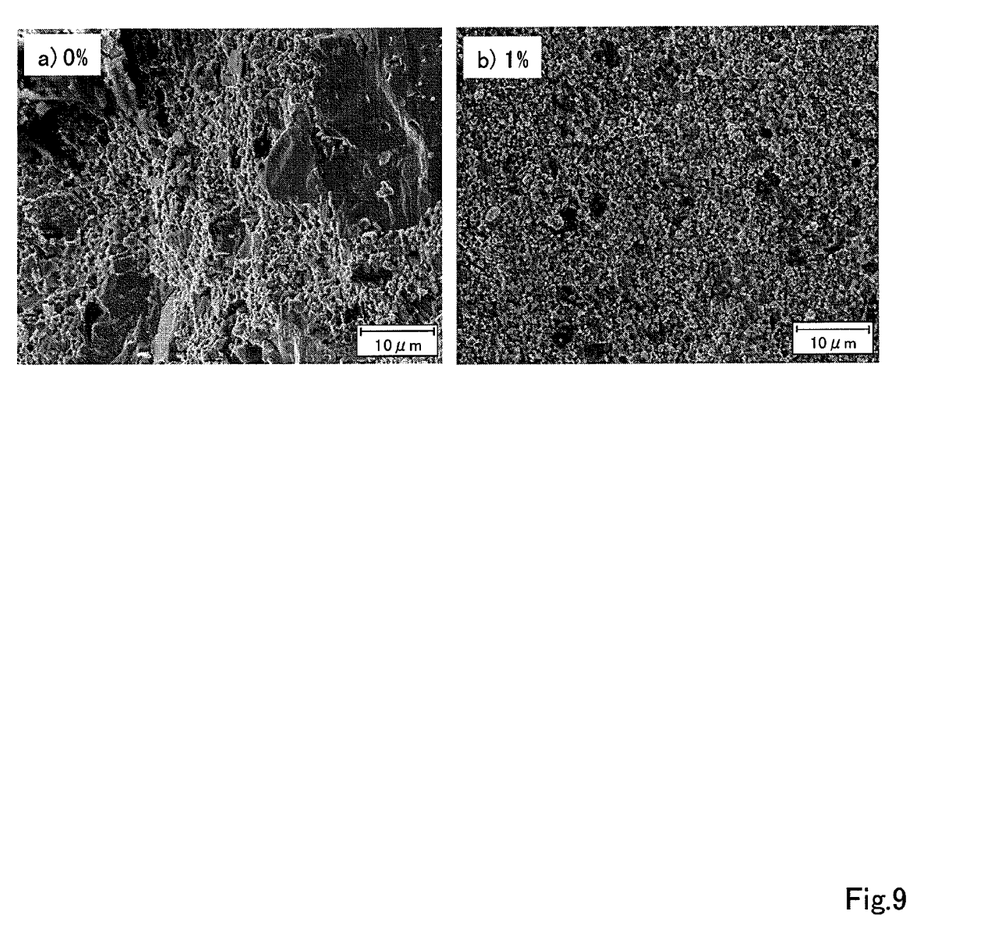
FIG. 9 shows results of SEM observation of cross-sections of the resulting sintered bodies (YSZ 0 mass % and 1 mass % samples).

The volume and weight of the resulting sintered body were measured, and the density calculated. The results are shown in FIG. 8. FIG. 9 shows the results of scanning electron microscope (SEM) observation of cross-sections of the resulting sintered bodies (0 mass % and 1 mass % samples).

As shown in FIG. 8, the density of the lanthanum-calcium-strontium-chromium oxide, which was 5.3 g/cm$^3$ without added 3YSZ, rose to 6% with 1 mass % 3YSZ added, and to 9% with 5 mass % added. As shown in FIG. 9, moreover, it was confirmed by scanning electron microscopy (SEM) that adding a small amount of 3YSZ resulted in finer and denser crystal grains.

The invention claimed is:

1. A stack structure for a solid oxide fuel cell, comprising:
   a plurality of stacked single cells, each comprising:
   a solid electrolyte;

a fuel electrode layer comprising a fuel electrode; and an air electrode layer comprising an air electrode, the fuel electrode layer and the air electrode layer being respectively arranged on opposite sides of the solid electrolyte;

a separator arranged between the stacked single cells to separate the single cells; and non-porous seal parts located within the fuel electrode layer and the air electrode layer, wherein the non-porous seal parts are equivalent to either the separator or the solid electrolyte at least in terms of thermal expansion and contraction characteristics, and are integrated with an edge of the fuel electrode or an edge of the air electrode and also with an adjacent separator and an adjacent solid electrolyte, wherein the stack structure is formed such that a stream of fuel gas is supplied to the fuel electrode and a stream of air gas is supplied to the air electrode respectively, and the non-porous seal parts are integrated with the edge of the fuel electrode or the edge of the air electrode, and also integrated with the adjacent separator and the adjacent solid electrolyte by sintering, and wherein at least one of the single cells in the stack does not have cell support.

2. The stack structure according to claim 1, wherein the seal parts have a same composition as one of the separator or the solid electrolyte.

3. The stack structure according to claim 1, wherein thicknesses of the solid electrolyte, the fuel electrode layer, and the air electrode layer in the single cell is each at least 1 μm but no more than 150 μm.

4. The stack structure according to claim 1, wherein no single cell support with enhanced mechanical strength is provided inside the single cell.

5. The stack structure according to claim 1, wherein the seal parts comprise a part of one of the separator or the solid electrolyte that extends into the fuel electrode layer or the air electrode layer.

6. The stack structure according to claim 1, wherein a unit composed of the single cell and one or two separators that are combined with the single cell has a flat overall shape.

7. The stack structure according to claim 1, wherein the separator comprises a lanthanum-chromium perovskite oxide and rare earth-doped zirconia.

8. A solid oxide fuel cell comprising the stack structure for the solid oxide fuel cell according to claim 1.

9. A solid oxide fuel cell system comprising the stack structure for the solid oxide fuel cell according to claim 1.

10. A method for manufacturing a laminated solid oxide fuel cell in which a plurality of single cells, each comprising a solid electrolyte, a fuel electrode layer comprising a fuel electrode, and an air electrode layer comprising an air electrode, the fuel electrode layer and the air electrode layer being respectively arranged on opposite sides of the solid electrolyte, are stacked with a separator intervened to separate the single cells, the method for manufacturing a laminated solid oxide fuel cell comprising:

preparing a laminate by repeating the following steps (a) and (b):

(a) preparing a first sheet comprising a solid electrolyte material which is a material of the solid electrolyte or a separator material which is a material of the separator, and (b) preparing a second sheet having an electrode material region comprising a fuel electrode material or an air electrode material and a seal material region for forming a non-porous seal part equivalent to either the solid electrolyte or the separator in terms of at least thermal expansion and contraction characteristics, and laminating this second sheet on the first sheet; and heat treating the laminate, wherein at least one of the single cells in the stack does not have cell support, and wherein the non-porous seal part is integrated with an edge of the fuel electrode or an edge of the air electrode and also with an adjacent separator and an adjacent solid electrolyte.

11. The method for manufacturing a laminated solid oxide fuel cell according to claim 10, wherein the seal material region of the second sheet has a same composition as the first sheet.

12. The method for manufacturing a laminated solid oxide fuel cell according to claim 10, wherein the second sheet is prepared by tape casting.

13. The method for manufacturing a laminated solid oxide fuel cell according to claim 12, wherein the second sheet is prepared by simultaneously casting the electrode material region and the non-porous material region.

14. The method for manufacturing a laminated solid oxide fuel cell according to claim 10, wherein an evaporative material layer, which has a pattern of a fuel gas conduit or an air gas conduit and is composed of an evaporative material that is to be eliminated by the heat treatment, is provided on the first sheet after the step (a) but before the step (b).

15. The method for manufacturing a laminated solid oxide fuel cell according to claim 10, wherein the separator material comprises a lanthanum-chromium perovskite oxide and rare earth-doped zirconia.

* * * * *